2,179,225

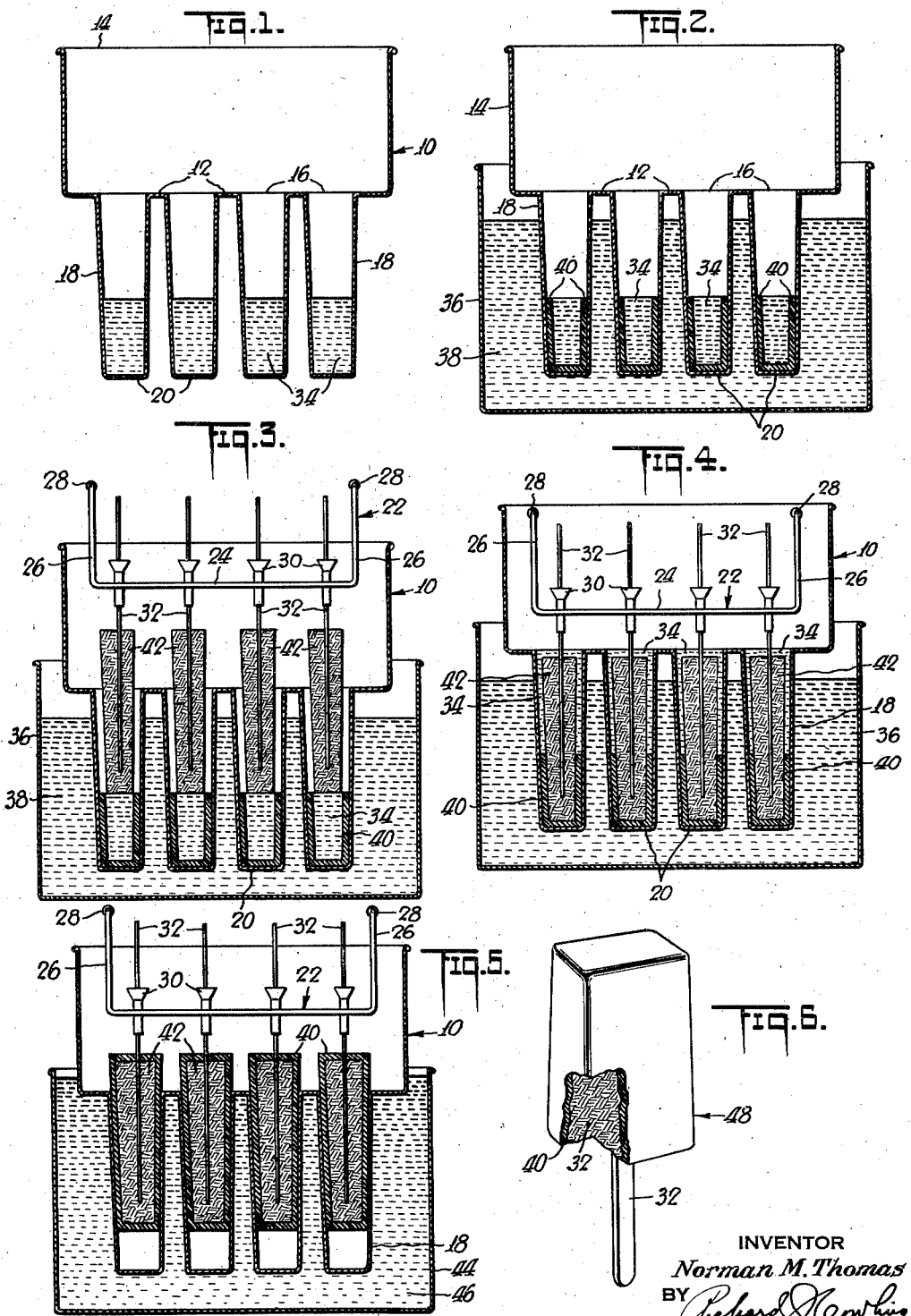
Nov. 7, 1939.     N. M. THOMAS     2,179,225
METHOD OF MAKING MULTIFLAVORED OR COMPOSITE FROZEN CONFECTIONS
Filed Sept. 23, 1938
INVENTOR
Norman M. Thomas
BY
ATTORNEY Patented Nov. 7, 1939

UNITED STATES PATENT OFFICE 2,179,225

METHOD OF MAKING MULTIFLAVORED OR COMPOSITE FROZEN CONFECTIONS

Norman M. Thomas, Pelham, N. Y., assignor to Joe Lowe Corporation, New York, N. Y., a corporation of Delaware Application September 23, 1938, Serial No. 231,288

9 Claims. (Cl. 107—54)

The present invention relates to a method of forming, refrigerating and harvesting flavored syrup, water-ice, sherbet, ice cream, frozen custard and the like in individual servings or confections, each of which consists of a combination of different flavors of the same substance or a combination of such different substances, the servings being provided with or without a handle member as desired. The invention has particular relation to a new and improved method of making such individual composite servings or confectionery products in a most efficient, economical and sanitary manner.

Heretofore, confectionery products have been made in the form of individual servings consisting of various combinations of flavors and/or substances entirely by hand molding operations, or by the use of two molds in the following manner: The first and larger mold was first partially filled with a substance to be frozen, and a second or smaller mold was then inserted or positioned therein, the lower ends of the mold cavities of the second or smaller mold being immersed in the liquid or fluid substance in the partially filled larger or outer mold, thereby displacing a portion of such fluid substance and causing the same to rise and fill the space between the two concentrically spaced molds. The mold combination was then subjected to refrigeration until the substance therebetween was solidly frozen and thereby bonded to the adjacent surfaces of the two molds. The mold combination was then removed from the refrigerating medium and the smaller or inner second mold cavities, which were empty, were heated by filling the same with warm water or by any other suitable means to cause a melting of the bond between the inner second mold and the frozen substance in the first mold so that the second or inner mold may be released from its bond to the frozen substance and withdrawn from the first and outer mold, thereby forming a frozen shell or cavity in the frozen substance in the first mold. The cavities thus formed in the frozen substances in the first or outer mold are thereupon filled with a second liquid or semi-frozen substance of another kind or flavor, and the first mold and contents are again placed in a refrigerating medium until the second and new substance is completely frozen and thereby bonded to the first substance. The first mold is then defrosted by momentarily dipping the same in warm water, and the finished confections are removed therefrom. Another method of forming such servings or confections is disclosed in United States Letters Patent No. 2,087,729, issued July 20, 1937, to Richard J. Cowling, for improvements in "Method of making multiflavored frozen confections".

The foregoing processes of manufacture involve a number of extra steps or require the use of special equipment for forming, refrigerating and/or handling the confection material with resultant disadvantages which may be obviated by practicing the present invention. The following described method of processing such multiflavored or composite confectionery products requires a fewer number of actual manufacturing operations, a minimum amount of refrigeration, a shorter freezing period, and permits the use of conventional equipment thereby eliminating the requirement for any specialized molding apparatus, resulting in increased efficiency, economy and sanitation.

An object of the present invention is to provide a new and improved method of manufacturing such composite frozen confectionery products in a most efficient, economical and sanitary manner.

Another object of the invention is the provision of a new and improved process for the manufacture of such composite frozen confectionery products which requires but the use of a single freezing mold for carrying out all of the freezing operations.

A further object of the invention is the provision of a new and improved method of manufacturing such frozen confectionery products without requiring their removal from the freezing medium at any time during the freezing process, thereby materially shortening the freezing time.

Another object of the invention is to provide a new and improved method of manufacturing such composite frozen confectionery products which requires no specialized equipment for carrying out the various steps thereof.

Other and further objects and advantages of the invention reside in the detailed description of the method employed and apparatus used, which result in simplicity, economy and efficiency, and which will be apparent from the following description, wherein a preferred form of embodiment of the process is diagrammatically shown, reference being had to the accompanying drawing, forming a part hereof, in which:

Fig. 1 shows a cross-sectional view of a conventional mold used in forming and refrigerating a plurality of frozen confectionery products, the same being shown partially filled with a fluid substance which is to be utilized in forming the outer coating for the completed composite confectionery product;

Fig. 2 shows a similar cross-sectional view of the mold and contents shown in Fig. 1, illustrating the manner in which the same is positioned in a circulating brine freezing tank in carrying out the first step in freezing the material in my new and novel process;

Fig. 3 is a cross-sectional view of the molding and refrigerating apparatus shown in Fig. 2, and illustrating the manner in which the separately frozen and preformed inner core is positioned and immersed in the remaining unfrozen liquid substance of the freezing mold;

Fig. 4 is a cross-sectional view of the molding and refrigerating apparatus shown in Fig. 3, showing the completely frozen confectionery products at the end of the freezing operation;

Fig. 5 is a cross-sectional view of the mold and contents shown in Fig. 4, illustrating the step of removing the completely frozen confectionery products while the cavities of the mold are submerged in a defrosting tank containing warm water; and Fig. 6 is a perspective view, on an enlarged scale and partly in section, of a finished composite serving made in accordance with the invention, wherein the same has been provided with a handle member to facilitate eating.

Referring now to the drawing, there is shown in Fig. 1 a mold structure 10, having a filling pan 12, upstanding side and end walls 14 and a plurality of spaced openings 16 therein. Mounted in the openings 16 of the filling pan 12 are depending mold cavities 18 having a closed bottom 20, thereby providing an open-top mold capable of forming a frozen confectionery product. This mold 18 may be of any shape or size depending upon the shape and/or size of the confectionery product desired to be produced therefrom.

The rack or peg structure 22, shown in Figs. 3, 4 and 5, consists of a bar 24 mounted between upright end plates 26, having handles 28 positioned at the extreme upper ends thereof to facilitate grasping and manipulation by the hands of the operator. The peg structure 22 has means, diagrammatically shown at 30, for receiving and releasably locking handle members 32 therein. For the details of construction of such a suitable apparatus, which forms no part of the present invention, reference is made to United States Letters Patent No. 2,024,116, issued December 10, 1935, to Herbert A. Siemund, entitled "Stick handling mechanism".

The present invention may also be practiced for the production of bars or unitary servings having no permanent handle manipulating means. In such case it is recommended that a so-called "spur plate" apparatus be employed for manipulation of the frozen inner cores and removal of the finished composite confections during the various steps involved in practicing the present invention. A suitable "spur plate" apparatus is shown and described in United States Letters Patent No. 2,056,127, issued September 29, 1936, to Herman Siemund, entitled "Molding apparatus." It is to be understood that when bar type products are to be manufactured under the present invention, the "spur plate" apparatus should be substituted for the peg structure 22 shown in Figs. 3, 4 and 5.

Although neither the peg structure 22 nor the spur plate apparatus referred to hereinabove is essential to practising the present invention, nevertheless they illustrate two of the best forms of conventional manipulating devices used widely in the industry in the production of frozen confectionery products, and similarly functioning apparatus is highly recommended in view of the advantages secured in handling a plurality of confections simultaneously in a most efficient and sanitary manner.

In practising my new and improved process, I partially fill the mold 18 with a liquid or semi-fluid substance 34 to be frozen, as best shown in Fig. 1. This substance 34 forms the outer surface of the finished product, and may be of any substance, flavor or color desired. The substance 34 need not be a liquid substance in the strict meaning of that term, but may be a semi-fluid substance, such as semi-frozen ice cream as it is withdrawn from a conventional ice cream freezer (not shown). In other words, the substance 34 may be any substance which is fluid in nature and capable of being displaced by the immersion of the preformed inner core.

After the molds 18 of the mold structure 10 are partially filled with the fluid substance 34, the amount having been predetermined and sufficient to provide an enrobing outer coating of the thickness desired for the entire inner core of the finished confectionery product, it is placed in a freezing tank 36 containing circulating brine 38 of refrigerating temperatures. The liquid substance 34, which only partially fills the mold 18, is then permitted to freeze until a desired amount thereof has become frozen into an open-top outer shell or cup 40, having a desired thickness, which must also be predetermined. In the freezing of fluid substances 34 in the manner shown, the freezing or ice formation begins adjacent the inner surfaces of the mold 18 and continues inwardly from all sides and the bottom at the same rate. This formation of the ice is due to the fact that these surfaces are in direct contact with the circulating brine 38. Obviously, under such conditions, with a given liquid material 34 and circulating refrigerating brine 38, the temperatures and rate of freezing are known, it is merely a matter of simple experiment or mathematical calculation to determine the actual time required for the liquid substance 34 to become solidly frozen to a given thickness, thereby forming an open-top shell or cup 40 of the proper thickness which is completely filled with the remaining and still unfrozen liquid material 34. Manifestly, the thickness of the outer shell or cup 40 can be varied at will by merely controlling the time or rate of freezing until the desired thickness of the ice forming the shell 40 is secured.

A separately and preformed inner core 42, which is already mounted on a handle member 44, is utilized as the center of my composite confectionery product. The manner in which this core or center 42 may be formed comprises no part of my invention. One method that is widely used to make such cores 42, which might in themselves be completed confections of a single substance or flavor, is described in United States Letters Patent No. 1,470,524, issued October 9, 1923, to Harry B. Burt. Another method is described in United States Letters Patent No. 1,505,592, issued August 19, 1924, to Frank W. Epperson, entitled "Frozen confectionery." A third method is described and shown in United States Letters Patent No. 1,520,302, issued December 23, 1924, to William C. Morgan, entitled "Frozen confection."

When the outer shell or cup 40 is frozen to the desired thickness, which as above stated has been carefully predetermined in order to provide sufficient space therein for telescopically receiving the lower end of the center core 42, the preformed center core or confection 42 is positioned therein by means of the protruding end of its handle member 32 until the lower end thereof is immersed, as shown in Fig. 3, in the remaining unfrozen substance 34 in the shell or cup 40, and until it substantially contacts the frozen bottom portion thereof. The volume of the pre-formed core 42 must be equal to the difference in the cubical dimensions of the mold cavity 18 and the amount of liquid material 34 originally placed therein, so that when the frozen core 42 is immersed in the unfrozen liquid 34 in the frozen shell or cup 40, the former is caused to rise and fill the space above the frozen shell 40 and between the mold 18 and the core 32, as best shown in Fig. 4. The frozen shell or cup 40, which substantially contacts the lower end and sides of the frozen core 42 as it is telescopically positioned therein, acts as a guide for centering the core 42 centrally of the mold 18. This step of inserting the preformed core 42 into the mold 18 and contents 34 and 40 may be accomplished without removing the mold structure 10 from the brine tank 36 and brine 38, thereby avoiding any rise in temperature of the molds 18 and contents 34 and 40. My process eliminates the requirement of utilizing a second mold structure to form the outer frozen shell 40, and further eliminates the possibility of freezing the inner core 42 off-center, a frequent occurrence in a molding process where the inner core 42 is immersed in mold containing only a fluid substance. Also, the time of freezing and the rate of freezing is materially shortened. The mold 18 and contents once they are placed in the brine tank 36 are preferably never removed and the period of refrigeration required to form the shell or cup 40 also reduces the temperature of the remaining unfrozen liquid 34 contained therein to substantially the freezing point. Consequently, when the center core 42 is positioned within the mold 18 the final step of freezing is very quickly accomplished and before any melting of the core 42 can result from its contact with the unfrozen liquid 40 within which it is submerged. Likewise, even the upper part of the sidewalls of the mold 18 above the frozen shell or cup 40 are chilled by their continual direct contact with the refrigerating brine 38 to substantially the temperature of said brine, and when the precooled unfrozen liquid 34 is displaced from the shell 40 and caused to rise into intimate contact with such extremely cold sidewalls of the mold 18, it freezes almost instantly and a very substantial savings in freezing time and amount of refrigeration required to produce such products results giving increased production for the same equipment. Furthermore, my process eliminates the use of one mold and the necessity of heating said second mold to defrost and remove the same to form the outer shell in the first mold, as in the case of the double mold method hereinbefore described. Such a defrosting operation causes a heating and partial melting of the frozen surfaces of the shell, and the refreezing of such melting requires additional time and refrigeration in the second freezing operation in such method.

When the remaining unfrozen liquid material 34 in the shell 40, which has been displaced and caused to rise up and fill the space between the sides of the mold 18 and the core 42 and cover the top of the latter, is frozen, the mold structure 10 and contents are removed from the brine tank 36 and momentarily positioned or dipped in a defrosting tank 44, containing warm water 46, as best shown in Fig. 5. This heat-treating step melts the ice bond formed between the completed outer surface of the enrobing substance or shell 40 and the inner surfaces of the mold 18, thereby releasing the finished confections therefrom, and they may then be simultaneously removed from their respective molds 18 of the mold structure 10 by means of the portable carrier 22, which has the protruding ends of the handle members 32 securely fastened therein. These confections 48 are now ready to be wrapped or bagged, and boxed for distribution and sale to the trade.

Although I have only described in detail one embodiment which my invention may assume, it will be readily apparent to those skilled in the art that the invention is not so limited, but that various modifications may be made therein without departing from the spirit thereof or from the scope of the appended claims.

What I claim is:

1. The method of forming, refrigerating and harvesting a multiflavored or composite frozen confectionery product which comprises partially filling a mold with a fluid substance to be frozen, freezing a portion of the substance adjacent the inner surfaces of the mold, inserting a preformed core of another substance into the unfrozen first substance until the latter is displaced and caused to rise filling the spaces between the core and the mold, completing the freezing until the two substances are entirely frozen, and then removing the composite confectionery product from its mold.

2. The method of forming, refrigerating and harvesting a multiflavored or composite frozen confectionery product which comprises partially filling a mold with a fluid substance to be frozen, freezing a portion of the substance to form an open-top frozen shell and simultaneously precooling the remaining unfrozen fluid substance, inserting a preformed core of another substance into said shell and causing the unfrozen precooled fluid substance therein to rise and fill the spaces above said shell and between said core and mold, completing the freezing of the unfrozen first substance until the same is frozen to the inner core, and then removing the finished confectionery product from said mold.

3. The method of forming, refrigerating and harvesting a multiflavored or composite frozen confectionery product which comprises partially filling a mold with a fluid substance to be frozen, placing the mold and contents under refrigeration until a portion of the fluid substance is frozen into an open-top frozen shell of a predetermined thickness, inserting a preformed core of another frozen substance into said open-top shell until the lower end thereof substantially contacts the bottom of said shell and causes the unfrozen fluid substance therein to rise and enrobe the upper portion of said core above said frozen shell, completing the freezing of the unfrozen portion of said first substance until the same is frozen to the inner core, removing the mold from refrigeration, and then removing the finished confectionery product from said mold.

4. The method of forming, refrigerating and harvesting a multiflavored or composite frozen confectionery product which comprises partially filling a mold with a fluid substance to be frozen, freezing a portion of the substance adjacent the inner surfaces of the mold to a predetermined thickness, inserting a pre-formed core of another substance of the same shape but of smaller cross-sectional dimensions into the frozen shell of the first substance until the lower end thereof is substantially contacting the bottom of said shell and the unfrozen first substance therein has been displaced and caused to rise and fill the spaces between said core and the mold above said shell to form a uniform coating for said preformed core, completing the freezing until the entire contents of the mold is frozen solidly, and then removing the finished composite confectionery product therefrom.

5. The method of forming, refrigerating and harvesting a multiflavored or composite frozen confectionery product which comprises partially filling a mold with a fluid substance to be frozen, freezing a portion of the substance to a predetermined thickness to form an open-top shell, inserting a preformed core of another substance of smaller cross-sectional dimensions into the frozen shell of the first substance until the lower end thereof is telescopically positioned therein and has caused the unfrozen first substance therein to be displaced and caused to rise and fill the spaces between said core and the mold walls and also completely cover the upper end of said core, completing the freezing until the entire contents of the mold is frozen solidly, and then removing the finished composite confectionery product therefrom.

6. The method of forming, refrigerating and harvesting a multiflavored or composite frozen confectionery product which comprises partially filling a mold with a fluid substance to be frozen, freezing a portion of the substance adjacent the inner surfaces of the mold to a predetermined thickness, inserting a preformed core of another substance having a handle member protruding from one end thereof into the unfrozen remaining substance in the mold until the former is positioned centrally thereof by the frozen portion of the first substance and the unfrozen portion is displaced and caused to rise into the remaining unfilled spaces in said mold, continuing the freezing process until the two substances are solidly frozen into an integral mass, and then removing the mass from the mold by the protruding end of its handle member.

7. The method of forming, refrigerating and harvesting a multiflavored or composite frozen confectionery product which comprises partially filling a mold with a fluid substance to be frozen, subjecting the mold and contents to refrigeration until a portion of the fluid substance is frozen to form an open-top frozen shell, inserting a preformed core of another substance having a handle member protruding from one end thereof into the unfrozen remaining substance in the mold until the former is telescopically positioned within the open-top frozen shell and the unfrozen portion is displaced and caused to rise into the remaining unfilled spaces in said mold, continuing the freezing process until the two substances are solidly frozen into an integral mass, removing the mold and contents from the refrigeration and then removing the mass from the mold by the protruding end of the handle member.

8. The method of forming, refrigerating and harvesting a multiflavored or composite frozen confectionery product which comprises partially filling a mold with a fluid substance to be frozen, freezing a portion of the substance in the mold into an open-top shell filled with the remaining unfrozen substance, inserting a preformed core of another frozen substance having a protruding handle member by said handle member into said shell, thereby causing the unfrozen liquid therein to rise and completely cover said core, continuing the freezing until the unfrozen liquid is completely frozen into an integral mass with the core, defrosting the mold by heat-treating the same to break the bond between the outer surfaces of the first substance and the inner surfaces of said mold, and then withdrawing the confectionery product from said mold by the protruding end of its handle member.

9. The method of forming, refrigerating and harvesting a multiflavored or composite frozen confectionery product which comprises partially filling a mold with a fluid substance to be frozen, placing the mold and contents under refrigeration until a portion of the substance in the mold is frozen into an open-top shell filled with the remaining unfrozen substance, inserting a preformed core of another frozen substance having a protruding handle member by said handle member into said shell until the lower end thereof is telescopically positioned therein thereby causing the unfrozen liquid in said shell to rise and completely cover said core, continuing the freezing until the first substance is entirely frozen and bonded to said core, removing the mold and contents from refrigeration, defrosting the mold by heating the same to release the confection therefrom, and then withdrawing the finished composite confectionery product therefrom by its handle member.

NORMAN M. THOMAS.